Patented May 14, 1940

2,200,353

UNITED STATES PATENT OFFICE 2,200,353

PROCESS OF PREPARING A CASEIN SOLUTION

John P. Alig, Indianapolis, Ind., assignor to Sargent-Gerke Company, Indianapolis, Ind., a corporation of Indiana No Drawing. Application March 18, 1939, Serial No. 262,775

5 Claims. (Cl. 134—12)

This invention relates to the forming or producing of a stable casein solution and/or dispersion and the product itself, and consists essentially of peptizing and/or dissolving any acid precipitated casein by means of a mixture alkali-metal fluoride and boric acid in the presence of regulated quantities of water and heat.

A primary object of the invention is to provide a casein solution or dispersion (the product probably being both a dispersion and solution) having a smooth appearance, good flowing properties, and stability in respect to its initial viscosity over relatively long periods of time and remaining stable even though somewhat acidic or basic materials be added.

A further primary object of the invention is to provide such a casein product (hereinafter termed a solution, dispersion being included) which may be used in many of the industrial processes for the making of water-paste paints; water-oil emulsions; glues; sizes; insecticides; printing inks; etc.

A further primary object of the invention is to form a casein gel having a high percentage of casein which may be melted simply by heating, which may be used as a gel or may be modified to suit individual conditions by adding water or pH modifying agents. The product formed has excellent keeping qualities and lends itself to easy handling, particularly in small plants that do not have cooking or agitating equipment otherwise required to handle caseins produced by processes heretofore developed. Good flowing qualities are to be had in addition to forming a casein solution having a heavy body.

A still further important object of the invention is to form a casein solution having a pH less than 7 and being relatively stable in respect to hydrolysis and putrefaction, materials being employed in the process of forming the solution which are in themselves bactericidal in nature.

A still further important object of the invention is the production of a casein solution which may be either slightly neutral acid or alkaline in nature without directly employing alkalies in the process, thus simplifying operations, and also permitting low cost of production, as well as reducing danger of injury to operators.

As above indicated, the final viscosity of the casein solution and/or dispersion can be controlled by varying the amount of water present. If the ratio of water and casein are held constant the final viscosity and pH of the finished material can be varied by changing the amounts of fluoride and boric acid used to dissolve the casein. If the ratio of boric acid, casein, and water are held constant, the final viscosity and pH of the finished product can be varied to some extent by changing the alkali-metal fluoride used.

When the materials are mixed the casein seems to melt into solution without going through a lumpy stage. Depending on the materials used and the ratios in which they are present, the finished solution has a high or low viscosity and its reaction may be either basic or acidic. The finished product may be diluted or rendered alkaline without its losing its useful properties.

I have found that the pH of the finished solution may be controlled by the choice of the alkali fluoride used as well as by the amount in which it is present. Sodium fluoride and/or ammonium fluoride with boric acid give the most satisfactory results and, for reasons of economy, I prefer to use them. However, I do not intend to limit my invention to the use of these compounds because by using any soluble alkali-metal fluoride with boric acid, I can produce a stable casein solution and/or dispersion. Fluorides in the presence of an amphoteric material such as boric acid seem to hydrolyze in such a manner that a weakly alkaline solution is formed. This solution at once peptizes or dissolves the casein, rapidly and uniformly. Any lumps of dry casein powder disintegrate at once with very slight agitation.

The amount of water used may vary widely depending on the final viscosity desired. I have found that the best results are obtained by using by weight, 400 to 800 parts of water with 100 parts of casein, these proportions being easy to cook and handle. The use of boric acid in the mixture renders it possible to dissolve or disperse the casein at much lower temperatures and with greater rapidity than possible with any other amphoteric material. With casein solutions of 12% or less, solution will readily take place at room temperatures. I prefer to cook the reaction mixture at about 160–190 degrees F. since, at these temperatures, much higher concentrations of casein can be handled easily and the solution takes place with greater speed and the final viscosity is attained in a short interval of time as compared to lower temperatures. It is to be understood that the temperature of the cooking can be varied within wide limits, without badly affecting the final product and that the range of temperatures may safely be from 60 to 210 degrees F., or with special equipment, even temperatures may be used.

The following table depicts the effect of boric acid on a reaction mixture of casein, sodium fluoride and water:

| | | |
|---|---|---|
| Casein | 100 parts | 100 parts. |
| Sodium fluoride | 8.4 parts | 8.4 parts. |
| Boric acid | 0 | 3 parts. |
| Water | 400 parts | 400 parts. |
| Appearance | Undispersed | Smooth, gluey consistency. |

It is to be clearly understood that any acid-precipitated casein may be used. Lactic casein dissolves most rapidly, but sulphuric and muriatic caseins are almost as fast and have slightly different properties which would make their solution more desirable for certain purposes.

The effect of boric acid can be more readily appreciated if with two heated identical mixtures of casein, water and fluoride, one adds a boric acid solution to one of them. Solution will take place at once in the mixture containing boric acid. The other mixture without the boric acid will remain unaffected if it is a sulphuric, muriatic or high-viscosity lactic, or, with low-viscosity, lactic casein, it will become stringy and somewhat gluey on prolonged heating but no uniformity of solution will be attained.

The term alkali-metal fluoride as herein employed is intended to include all of the monovalent alkali-metal fluorides and ammonium fluoride. The term casein includes all of the acid-precipitated caseins, including muriatic casein, lactic casein and sulphuric casein.

As one illustration of the process for making a casein solution and/or dispersion embodying my invention, the following description of a typical laboratory size batch and direction for making same are given:

To 100 grammes casein, add 600 grammes water, 3 grammes boric acid, and 8.4 grammes sodium fluoride. Stir until uniformly moistened and heat the mixture in a water bath to 185 degrees F. Hold at this temperature for 10 minutes. The resulting solution and/or dispersion will be, when cooled, a thick, viscous, freely flowing, glue-like material distinctly acid to litmus and quite stable as regards viscosity and freedom from putrefaction over relatively long periods of time.

While the solution is warm, any pH modifying agent may be added, or water for thinning purposes. However, these additions are totally unnecessary as regards dissolving and/or dispersing the casein, and their purpose is merely for modifying the finished product so that it can be made to conform to any standards of pH, viscosity, and dilution which may have been previously determined. Variations in these properties may be caused by variations in the raw materials used, that is, in the boric acid, casein, fluoride and water.

This invention is not intended to be restricted to the precise materials, temperatures, proportions, and steps set forth except as may be required by the following claims.

I claim:

1. The process of producing a casein solution relatively stable as to hydrolysis, which consists of reacting with a casein in the presence of water, a casein solvent mixture which consists of a water soluble alkali-metal fluoride and boric acid.

2. The process of producing a casein solution having a pH less than 7 and which is relatively stable as to hydrolysis, which consists of heating to not to exceed 210 degrees F. and reacting with an acid precipitated casein, a solvent mixture of sodium fluoride and boric acid in the presence of water.

3. The process of producing a casein solution relatively stable as to hydrolysis, which consists of reacting with a casein in the presence of water, a casein solvent mixture which consists of a water soluble alkali-metal fluoride and boric acid, and heating within the range of 60 to 210 degrees F.

4. The process of producing a casein solution relatively stable as to hydrolysis, which consists of reacting with casein in the presence of water, a casein solvent mixture consisting of approximately 8 parts by weight of a water soluble alkali-metal fluoride and approximately 3 parts of boric acid, to each 100 parts of the casein.

5. The process of producing a casein solution relatively stable as to hydrolysis, which consists of reacting with casein in the presence of water, a casein solvent mixture consisting of approximately 8 parts by weight of a water soluble alkali-metal fluoride and approximately 3 parts of boric acid, to each 100 parts of the casein, said water being in the proportion of 400 parts.

JOHN P. ALIG.